L. O. FRENCH

Sept. 15, 1931. FUEL INJECTION SYSTEM Re. 18,195

Original Filed Feb. 15, 1926

INVENTOR

Louis O. French

Reissued Sept. 15, 1931

Re. 18,195

UNITED STATES PATENT OFFICE

LOUIS O. FRENCH, OF MILWAUKEE, WISCONSIN

FUEL INJECTION SYSTEM

Original No. 1,664,614, dated April 3, 1928, Serial No. 88,406, filed February 15, 1926. Application for reissue filed March 21, 1930. Serial No. 437,927.

The invention relates to fuel injection systems.

In electrically-controlled fuel-feeding or injection systems where the passage of fuel to the engine cylinder is controlled directly or indirectly by an electromagnetically-operated fuel-metering device, it has heretofore been proposed to vary the amount of fuel furnished the engine by varying the period of energization of the metering control electromagnet, and while I find that with suitable switch mechanism this may be carried out, I have discovered that a far more sensitive regulation of the amount of fuel may be effected by varying the strength of the current supplied to the metering control electromagnet and thus vary the duration of movement of the metering device, and the object of this invention is to provide a fuel feeding or injection system for effecting this result.

A further object of this invention is to provide a control mechanism for the control circuit for the electromagnetically-operated fuel metering devices wherein the period of energization of the control magnet may be substantially constant for varying speeds of the engine and the amount of fuel controlled by a variable resistance in said circuit which may be automatically varied by a speed-responsive device associated with the engine.

A further object of the invention is to provide a control mechanism for the control circuit for the electromagnetically-operated fuel metering device wherein both the period of energization and the extent of this energization may be varied so as to control the time the metering device is rendered operative and the duration of movement of said device, and, further, to associate these controls together so as to secure efficient regulation of the fuel supply to the engine.

The invention further consists in the several features hereinafter set forth and more particularly defined by claims at the conclusion hereof.

In the drawings, Fig. 1 is a semi-diagrammatic view of a fuel injection system embodying the invention;

Figure 1:
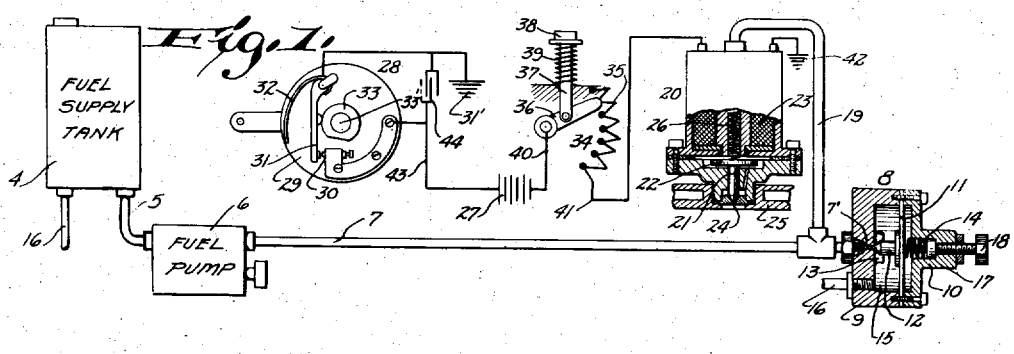

Referring to Fig. 1, the fuel injection system instanced here includes a fuel supply tank 4 connected by a pipe 5 with a fuel pump 6 of any suitable construction, which is generally driven by the engine and is adapted to supply fuel to a pressure supply pipe 7, and is preferably of a type to insure a relatively constant supply of fuel to said pipe 7 in which the fuel is maintained, while the pump is operating, at substantially constant pressure by means of a pressure valve mechanism of any suitable construction. As shown, pressure valve mechanism 8 includes a casing made up of parts 9 and 10 with a diaphragm 11 secured between them, a valve 12 working in a slotted guide tube 13 and being normally urged by a spring 14, acting on the diaphragm to close off communication between a small passage 7′ communicating with the pressure pipe 7 and the chamber 15 which communicates with a pipe 16 that returns the excess fuel to the tank 4, the tension of the spring 14 being adjusted by means of a slide block 17 associated with a bolt 18 in threaded engagement with the part 10 of the casing. From the pipe 7 branch pipes 19 (only one being shown) respectively lead to the engine cylinders. An electromagnetically-operated metering device, instanced here as a control valve device 20, which may be the fuel injector valve or which may be associated with a fuel-pressure-operated injector valve, as shown in my U. S. Patent No. 1,664,612 dated April 3, 1928, controls the supply of fuel from the pipe 19 to the cylinder of the engine with which said pipe is associated. This control valve device includes a control valve 21 having an armature 22 associated with an electromagnet 23 and controlling passage of fuel from its supply pipe 19 through the valve casing and a passage, here shown as the fuel nozzle 24, into the cylinder of the engine in the head 25 of which the device is mounted, a spring 26 normally tending to close the valve which is opened by the electromagnet attracting the armature 22 when the same is energized. The electromagnetic valve herein shown is more particularly described in the aforementioned application, but as any suitable construction of electromagnet valve may be used in the system, further description thereof is deemed unnecessary.

The metering control electromagnet 23 receives its current from a battery 27, or other suitable source of current supply, through a control circuit including a control switch mechanism 28. This control switch mechanism may be of any suitable construction and is here shown as including a rotatably adjustable case 29 carrying a suitably insulated fixed contact 30, a pivoted contact 31 urged by a spring 32 against a cam 33 mounted on a shaft 33′ driven by the engine, said cam permitting the contacts 30 and 31 to be engaged for a certain cyclic period and thereafter moving said contact 31 out of engagement with the contact 30, the timing of the circuit-closing period being determined by the angular adjustment of the case 29 relative to said cam.

The control circuit also includes a variable resistance device 34, here shown as including the resistance 35, and a pivoted switch arm 36 which may be operated in any suitable manner. As shown, this switch arm is arranged for manual operation, either by hand or foot, by connection with a suitably insulated rod or plunger 37 having a button 38 associated with a spring 39 normally acting to move the arm 36 so as to include the entire resistance 35 and which rod, upon the operation of the operator, moves the switch arm 36 to gradually cut out sections of the resistance 35.

A conductor 40 connects one side of the battery with the arm 36, and a conductor 41 connects the resistance with one terminal of the energizing coil of the electromagnet, while the other terminal of said coil is grounded at 42. A conductor 43 connects the other side of the battery with the insulated switch contact 30 while the other contact is grounded as at 31′. A condenser 44 may be connected across the contacts to reduce arcing.

With this construction the pumping system supplies the pipe 19 with fuel under pressure and the amount of this fuel passing to the engine is under the control of the metering valve 21, which in turn is controlled by the electromagnet. The electromagnet is energized when the contacts 30 and 31 are engaged and under these conditions current from the battery passes through the resistance 35 to the coil of the magnet, and the amount of this resistance is varied by changing the position of the arm 36 so as to include more resistance in the control circuit or reduce the resistance. This varies the strength of the current supplied to the electromagnet and this, in turn, varies its energizing effect so that with more resistance in the circuit the control valve will be lifted for a shorter period when the electromagnet is energized than when a greater current with less resistance is allowed to flow through said electromagnet, with the result that the duration of lift of the valve may be varied by varying the resistance and thus the amount of fuel passing by the valve may be readily varied. Thus the resistance introduced into the circuit may be such as to prevent the control valve from operating and may be tapered down to nothing so as to provide for varying the duration of lift of the valve.

I find that this produces a more sensitive control of the metering valve than could be possible mechanically, and that very small quantities of fuel may be handled so that the system may be used effectively on the relatively small bore engines of the automotive type. As shown, the cam 33 being one having an unvarying relief surface, an increase in engine speed will cut down the period of energization of the magnet, but this may be compensated for by cutting out some of the resistance. Furthermore, excluding the resistance while the engine is running at any given speed will produce an increased charge of fuel and cause the engine to accelerate. Where the engine is used as the propelling motor of a vehicle, the depression of the plunger 37 will act to accelerate the engine's torque and may in such an association be operated by the foot of the operator.

Figure 2:
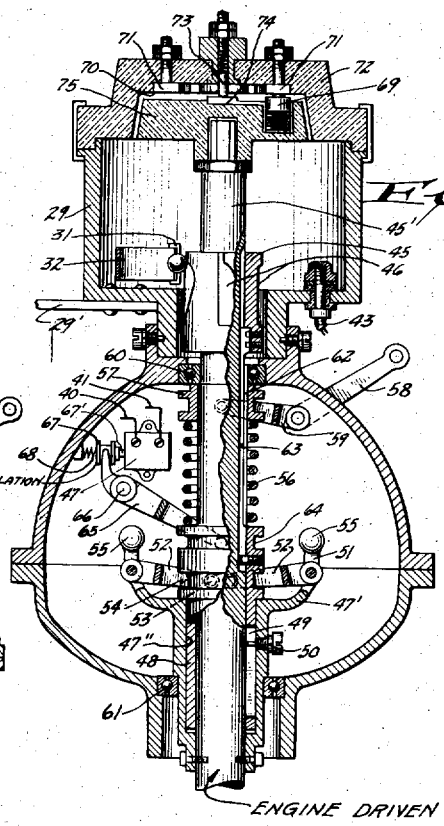
Fig. 2 is a vertical sectional view through a control mechanism embodying the invention.

In Fig. 2 I have shown a form of control mechanism in which a cam 45 is used in place of the cam 33 and is slidably mounted on an engine-driven shaft 45′. This cam has relief portions 46 which are tapered or so designed as to permit a substantially constant circuit-closing period of the contacts 30 and 31 (shown in full in Fig. 1) throughout a limited predetermined speed range under the action of the governor, and a variable resistance 47, here shown of the carbon pile type, is under the control of a speed-responsive device. As here shown, this device includes a spider 47′ fixed to the shaft 45′ and provided with a bore 47″ in which a sleeve 48 is free to move within the limits determined by a longitudinal slot 49 in said sleeve, and a pin 50 in the hub of the spider, and the oppositely disposed arms of said spider have levers 51 pivotally mounted thereon, their forked ends 52 being provided with pins 53 mounted in an annular groove 54 formed in the upper part of said sleeve, their outer ends carrying the weights 55, a spring 56, acting in opposition to the governor weights, interposed between the upper end of the sleeve 48 and a manually-controlled collar 57 slidably mounted on the shaft 45′. The collar is moved manually by a lever 58 pivotally mounted on the casing and having forked ends 59 provided with pin projections engaging in the groove of said collar, and an exteriorly disposed operating arm. The shaft 45′ is suitably journalled in bearings 60 and 61. The casing 29 is mounted in the main casing so as to be relatively adjustable and has a hand lever 29′ for this purpose.

The shaft 45′ has a key-way 62 therein and a key 63, slidably mounted in said key-way, is connected at its lower end with said sleeve 48 and at its upper end with said cam 45.

The sleeve 48 has an annular groove 64 therein and a forked lever 65 has pin projections engaging in said groove and is suitably pivoted at 66. The other end of this lever engages in the groove of an insulated head 67 on a plunger 67′ of the carbon pile rheostat 47 so that as the speed of the engine increases the plunger 67′ is moved outwardly, thereby decreasing the pressure between the carbon disks of said rheostat and thus increasing the resistance in the control circuit, a spring 68 bearing on said head 67 normally acting to move said plunger inwardly to put pressure on the carbon disks to decrease the resistance. As the construction of a carbon pile rheostat is well known, a detailed showing of the disks is not considered necessary.

As the resistance is increased the strength of the magnetic force will be decreased, as in the first-described construction, so that the amount of fuel will be decreased, but since the governor also acts on the cam 45 the period of energization will not be varied substantially for predetermined speed ranges. Thus, the resistance control acts to control the supply of fuel to the engine at different speeds by varying the duration of lift of the valve, and it will be apparent that the plunger 67′ may be manually operated and the governor then only insures a substantially constant period of energization. Furthermore, the movement of the collar 57 by the operator varies the tension of the spring 56 so that the governor may operate through different speed ranges to control the amount of resistance included in the control circuit and thus control the amount of fuel supplied to the engine.

In case of a multicylinder engine there are as many reliefs 46 on the cam 45 as there are engine cylinders and the current is distributed in desired cyclic sequence to the branch circuits connected with the electromagnets of the control valves by a spring-pressed brush 69 running over a commutator track 70 including spaced contac s 71 mounted in a removable head 72 of insulating material, said brush receiving current from a spring-pressed brush 73 carried by said head and bearing upon a conductor 74 carried by the rotary distributor head 75 of insulating material mounted on the shaft 45 and in which the brush 69 is mounted.

Figure 3:
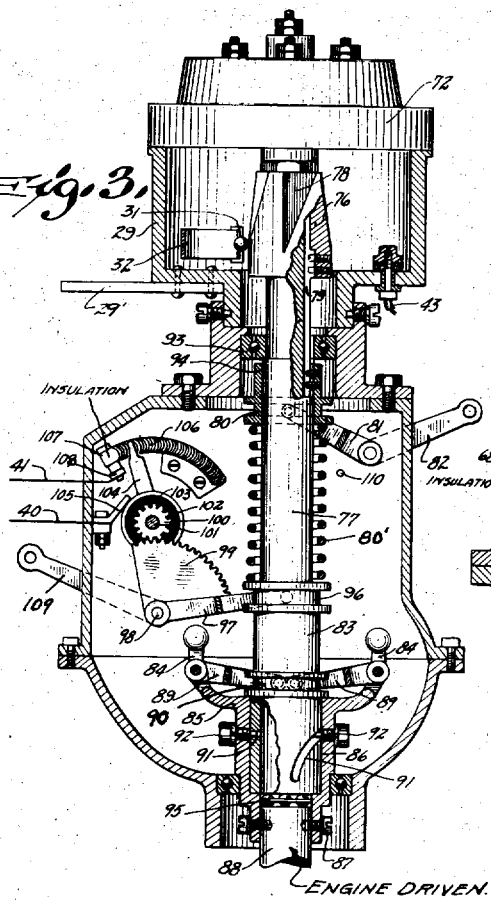
Fig. 3 is a vertical sectional view through another control mechanism embodying the invention.

In the construction shown in Fig. 3 a cam 76 cooperating with the movable contact 31 is slidably mounted on the shaft 77, with which it rotates, and has tapered relief portions 78 to vary the relative periods of time that the contacts 31 and 30 (shown in plan in Fig. 1) are engaged on the shifting of said cam longitudinally of said shaft, this longitudinal movement being effected by a key 79 working in a key-way in said shaft and connecting said cam with a collar 80 having an annular groove receiving the pin projections on the forked arms of a manually-operated lever 81 pivotally supported on the switch casing and having an exteriorly disposed operating arm 82.

A sleeve 83 is slidably keyed to the shaft 77 and moved longitudinally relative thereto by a governor, including the weighted levers 84 pivotally mounted on the arms of a spider 85 whose hub 86 is secured by screws 87 to an engine-driven shaft 88. The forked arms 89 of said levers 84 have pin projections engaging in an annular groove 90 of said collar, whereby to move said sleeve 83 upwardly upon an increase of speed. The sleeve 83 has oppositely disposed slots 91 of varying angularity formed therein. Pins 92 carried by the hub 86 work in said slots and form a driving connection between the shafts 77 and 88. These angular inclined slots 91 cooperate with said pins 92 and cause a relative angular movement between the hub 86 and sleeve 83, and hence between the shafts 77 and 88 on the longitudinal movement of said sleeve under the action of the governor, and thus cause an automatic changing of the timing of the injection period as the speed of the engine varies. This automatic change of timing may, of course, be used in the constructions with the cams shown in Figs. 1 and 2. The shaft 77 is journalled in a bearing 93 and has a shoulder 94 engaging the inner bearing race to prevent its upward longitudinal movement and a roller-thrust-bearing 95 is interposed between the shafts 77 and 88.

The sleeve 83 also has a grooved collar portion 96 operatively associated with the forked ends of a lever 97, with its pivot shaft 98 suitably journalled in the switch casing. This shaft carries a segmental gear 99 meshing with a gear 100 on a shaft 101 journalled in said casing. A disk 102 of insulating material is mounted on said shaft 101 and has a current collector ring 103 mounted thereon and conductively connected to a switch arm 104 secured to said disk. A brush 105 bears on the ring 103 and is connected to conductor 40. The arm 104 engages a resistance wire 106 spirally wound on a support of insulating material supported on the casing and connected at terminal 108 with the conductor 41. A spring 80′, interposed between the sleeve 83 and the collar 80, acts in opposition to the governor weights.

An exteriorly disposed manually-operated arm 109 is connected to the shaft 98 so that said lever may be operated independently of the governor, if desired.

A pin 110 in the casing acts as a stop to limit the downward movement of the lever 81 and hence the cam 76.

In the last-described construction movement of the cam 76 relative to the contact 31 varies the relative duration of energization period of the electromagnet, and longitudinal movement of the sleeve 83 under the action of the governor lever 89 swings the lever 97 about its pivot 98 and through the gears 99 and 100 turns the shaft 101 and hence swings the switch arm 104, which cuts in or out certain sections of the resistance 106 and thus varies the resistance in the control circuit, for the reasons pointed out in the first-described construction. Furthermore, movement of the collar 80 varies the tension of the spring 80′ to vary the action of the governor and thus accommodate for different speed ranges while varying the position of the cam 76, or the operation of the lever 109 varies the speed range of the governor independent of the position of the collar 80 and hence the cam 76. Thus both the period of energization and the amount of electrical energy furnished the magnet may be varied independently or together to vary the relative period of time the control valve is held open and the duration of lift of the valve during this period, and hence the amount of fuel supplied to the engine. With this construction the positioning of the cam 76 in different positions relative to the switch 31 may be used as a general regulator of the fuel supply to the engine to accommodate the load or speed, and the governor-controlled variable resistance under these conditions keeps the amount of the fuel within close limits at the desired load or speed, and the adjustment provided also provides for operation through varying speed ranges.

It will also be understood that the cam 76 may be used in place of the cam 45 in the construction shown in Fig. 2, so that the speed-responsive device acts to control both the duration of the energization of the magnet through the action of the cam and the strength of energization through the action of the rheostat, and that in this instance the rheostat serves as a more delicate control of the fuel supply under the action of the governor than the use of the cam 76 alone.

While the invention has been described more particularly in connection with an electromagnetically-controlled fuel-metering valve, it will be understood that in a broad sense any other suitable metering device may be associated with the electromagnet, in combination with the control means above described, hence the invention is not to be limited, unless otherwise specified, to the association of control means with a metering valve.

I desire it to be understood that this invention is not to be limited to any particular form or arrangement of parts except insofar as such limitations are specified in the claims or necessitated by the prior art.

What I claim as my invention is:

1. In a fuel supply system, the combination with a liquid fuel-metering valve, of an electromagnet for controlling said valve, a control circuit for said electromagnet including engine-controlled switch mechanism for periodically controlling said electromagnet, and a variable resistance for varying the current supplied to said electromagnet and thus vary the duration of lift of said valve and consequently the amount of fuel furnished the engine.

2. In a fuel supply system, the combination with a fuel-metering device, of an electromagnet for controlling said device, a control circuit for said electromagnet, engine-controlled switch mechanism for controlling said electromagnet, a rheostat for varying the current supplied to said electromagnet and thus vary the action of said device and consequently the amount of fuel furnished the engine, and an engine-operated speed-responsive device associated with said rheostat to control its operation.

3. In a fuel supply system, the combination with a liquid fuel-metering valve, of an electromagnet for controlling said valve, a control circuit for said electromagnet including periodically operated engine-controlled switch mechanism, a variable resistance for varying the current supplied to said electromagnet and thus vary the duration of lift of said valve and consequently the amount of fuel furnished the engine, and governor-controlled means for varying the duration of operation of said switch mechanism.

4. In a fuel supply system, the combination with a liquid fuel-metering valve, of an electromagnet for controlling said valve, a control circuit for said electromagnet including means for varying the duration and strength of energization of said electromagnet and thus vary the duration of time the electromagnet is energized and the duration of opening of said valve to thereby control the amount of fuel supplied to the engine.

5. In a fuel supply system, the combination with a fuel-metering device, of an electromagnet for controlling the operation of said device, a control circuit for said electromagnet including means for varying the duration of energization of said electromagnet, and means for varying the amount of current supplied to said electromagnet, and an engine-operated speed-responsive device associated with said last-named means to control its operation.

6. In a fuel supply system, the combination with a fuel-metering device, of an electromagnet for controlling the operation of said device, a control circuit for said electromagnet including means for varying the duration and strength of energization of said electromagnet and thus vary the operation of said device to control the amount of fuel supplied to the engine, and an engine-operated speed-responsive device for controlling said means.

7. In a fuel supply system, the combination with a liquid fuel-metering valve, of an electromagnet for controlling the operation of said valve, a control circuit for said electromagnet including switch mechanism periodically controlling the energization period of said electromagnet, a rheostat controlling the strength of current supplied to said electromagnet to control the effective duration of lift of said valve, and means for independently varying the action of said switch mechanism and said rheostat.

8. In a fuel supply system, the combination with a fuel-metering device, of an electromagnet for controlling the operation of said device, a control circuit for said electromagnet including engine-operated switch mechanism establishing current flow thereto for a substantially constant period for a predetermined speed range and a governor-controlled rheostat for varying the current supplied to said electromagnet and thus vary the action of said device and consequently the amount of fuel delivered to the engine.

9. In a fuel supply system, the combination with a fuel-metering device, of an electromagnet for controlling the operation of said device, a governor, a control circuit for said electromagnet including switch mechanism for varying the relative period of energization of said electromagnet, a governor-controlled rheostat for varying the strength of energization of said electromagnet, and means associated with said switch mechanism for varying the speed range of said governor as the period of energization of said electromagnet is varied by said switch mechanism.

10. In a fuel supply system, the combination with a fuel-metering device, of an electromagnet for controlling the operation of said device, a governor, a control circuit for said electromagnet including switch mechanism for varying the relative period of energization of said electromagnet, a rheostat, means for adjusting said switch mechanism and means for adjusting said rheostat independent of the adjustment of said switch mechanism, and governor-controlled means also operable to adjust said rheostat, said means cooperating to vary the amount of fuel furnished the engine.

11. In a fuel supply system, the combination with a liquid fuel-metering valve, a control electromagnet, of means including a variable resistance for controlling the action of said electromagnet to vary the duration of lift of said valve.

12. In a fuel supply system, the combination with a fuel-metering valve, of an electromagnet controlling said valve, and means periodically controlling the operation of said electromagnet including a variable resistance for varying the current supplied to said electromagnet and thus vary the duration of lift of said valve and consequently the amount of fuel furnished the engine.

13. In a fuel supply system, the combination with a fuel-metering valve, of an electromagnet for controlling said valve, a control circuit for said electromagnet including engine-controlled circuit control mechanism for controlling said electromagnet, and a variable resistance for varying the current supplied to said electromagnet and thus vary the duration of lift of said valve and consequently the amount of fuel furnished the engine.

14. In a fuel supply system, the combination with a fuel-metering valve, of an electromagnet for controlling said valve, a control circuit for said electromagnet including engine-controlled circuit control mechanism for controlling said electromagnet, and an engine-controlled variable resistance for varying the current supplied to said electromagnet and thus vary the duration of lift of said valve and consequently the amount of fuel furnished the engine.

15. In a fuel injection system, the combination with a fuel metering valve, an electromagnet controlling said valve, a control circuit for said electromagnet including means for either separately or simultaneously varying the duration and magnitude of the current supplied through said circuit to said electromagnet.

16. In a fuel injection system, the combination of a fuel-metering device, an electromagnet for controlling said device, and a control circuit for said electromagnet including a contactor having a contact adapted for constant period operation through a predetermined range of engine speed.

17. In a fuel injection system, the combination of a fuel metering device, an electromagnet for controlling said device, and a control circuit for said electromagnet including a contactor comprising an automatic, constant timed contact operable throughout a predetermined range of engine speed.

In testimony whereof, I affix my signature.

LOUIS O. FRENCH.